UNITED STATES PATENT OFFICE.

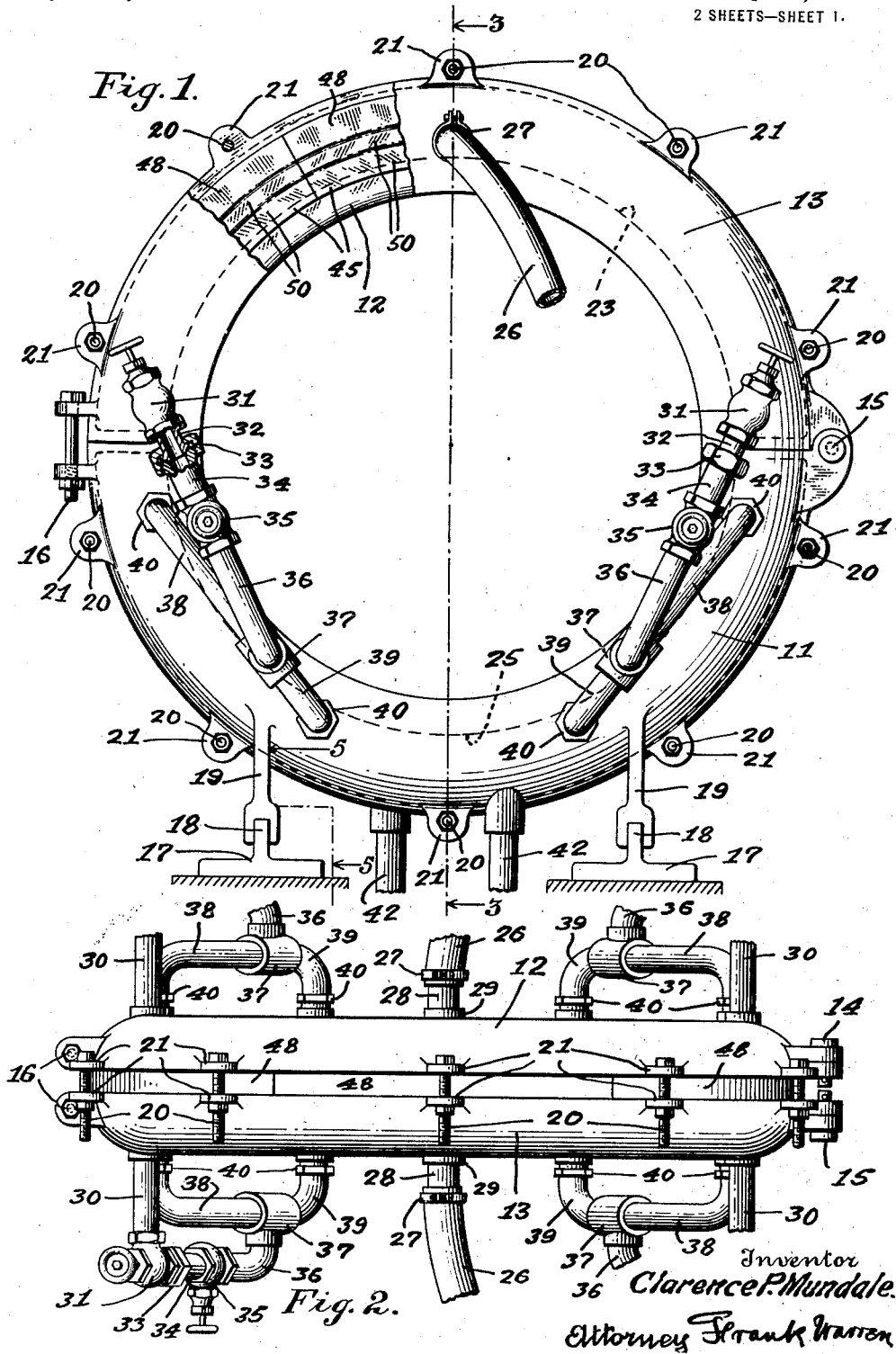

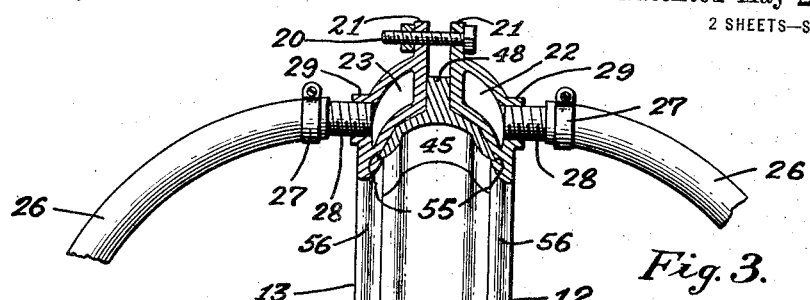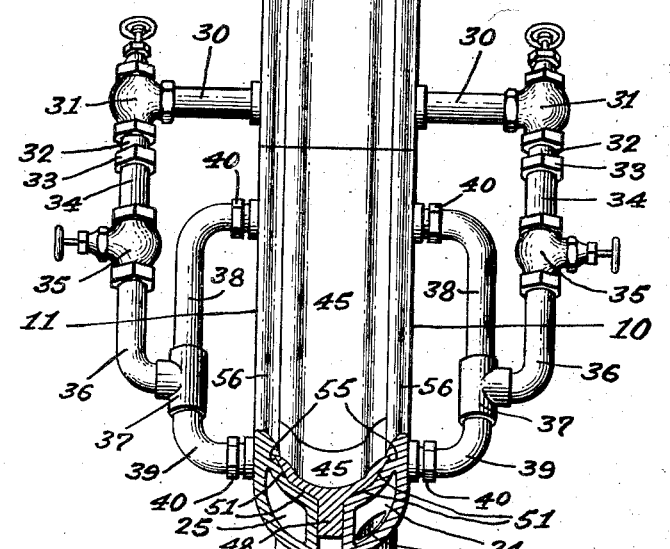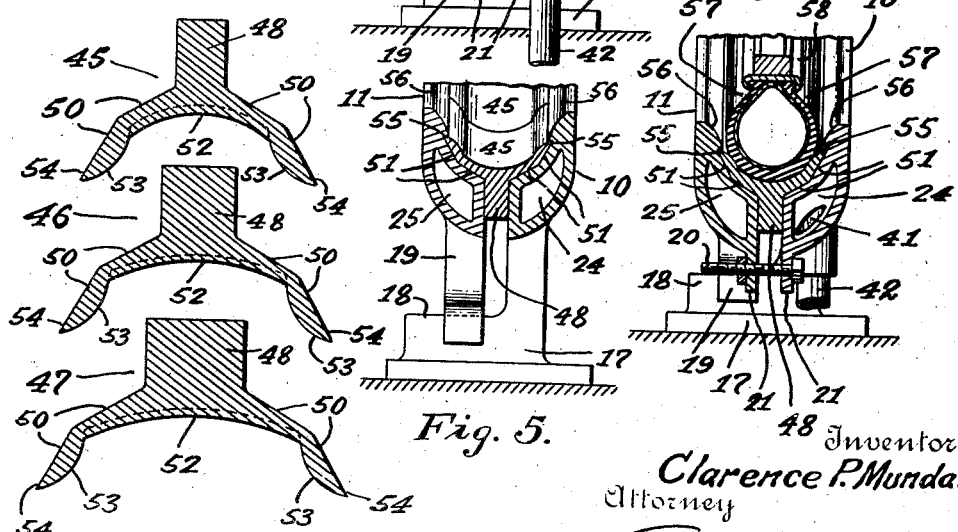

CLARENCE P. MUNDALE, OF SEATTLE, WASHINGTON.

TIRE-MOLD.

1,379,203.    Specification of Letters Patent.    Patented May 24, 1921.

Application filed July 27, 1920. Serial No. 399,267.

*To all whom it may concern:*

Be it known that I, CLARENCE P. MUNDALE, a citizen of the United States, residing at Seattle, in the county of King and State of Washington, have invented a certain new and useful Improvement in Tire-Molds, of which the following is a specification.

My invention relates to improvements in tire molds and more particularly to the type of tire mold adapted for use in retreading tires and the object of my invention is to provide an adjustable tire mold wherein tires of varying widths and slightly varying diameters may be efficiently and expeditiously retreaded in a single operation.

Another object is to provide a tire mold adapted for retreading tires which embodies means adapted to maintain a constant and uniform heat on the peripheral portion of the tire casing during the process of vulcanizing the retread thereon.

A further object is to provide a tire mold which is adapted to receive and securely engage therein an inflated tire to be retreaded, the inflated condition of the said tire providing and maintaining a uniform and constant peripheral pressure on the casing of the said tire to thereby retain the said casing substantially in its normal shape within the mold during the process of vulcanizing the retread thereon.

A still further object is to provide a tire mold which is adapted to receive and securely engage therein an inflated tire which embodies cooling means adapted to prevent impairment or deterioration of the inflated inner tube disposed within the said tire during the process of vulcanizing the retread on the casing of the said tire.

A still further object is to provide an axially adjustable tire mold adapted to receive and securely engage therein interchangeable forms or matrices of varying widths which are adapted for use in retreading tires, the said forms or matrices being provided on their inner walls with any desired design.

A still further object is to provide a tire mold for retreading tires which embodies simplicity, economy and durability in construction, that is positive and efficient in operation and that will not readily get out of order.

With the above and other objects in view which will appear as the description proceeds the invention consists of the novel construction, adaptation, arrangement and combination of parts hereinafter described and claimed.

I accomplish these objects by devices illustrated in the accompanying drawings, wherein Figure 1 is a view in side elevation of a tire mold embodying my invention, parts being broken away.

Fig. 2 is a top plan view of same;

Fig. 3 is a view in vertical transverse section taken on a broken line 3—3 of Fig. 1.

Fig. 4 is a view in vertical transverse section illustrating a plurality of matrices of varying widths adapted for use in my mold.

Fig. 5 is a fragmentary view in vertical transverse section taken substantially on a broken line 5—5 of Fig. 1 illustrating the adjustable feature of my mold.

Fig. 6 is a fragmentary view in vertical transverse section illustrating a tire in its operative position within my mold.

Referring to the drawings, throughout which like reference numerals designate like parts, the numerals 10, 11, 12 and 13 designate the upper and lower hollow semi-circular sections of my adjustable sectional mold.

The lower section 10 and the upper section 12 comprises one unit which is substantially stationary while the lower section 11 and the upper section 13 comprises a relatively movable unit which is adjustably disposed with respect to the first named unit.

The unit comprising the sections 10 and 12 is disposed substantially in a vertical plane, the section 12 being superposed on the section 10 and hingedly connected thereto as at 14 while the unit comprising the sections 11 and 13 are similarly disposed substantially in a vertical plane, the section 13 being superposed on the section 11 and hingedly connected thereto as at 15.

It will be obvious from the foregoing that this construction permits of ready access to the mold, the upper sections being adapted to swing upwardly on their respective hinge connections when desired. The said upper sections being further adapted to be positively secured or clamped in an operative or closed position by bolts 16 disposed diametrically opposite to the hinge connections 14 and 15, as shown more clearly in Figs. 1 and 2.

The lower or stationary section 10 is provided with downwardly projecting feet or base members 17 which may be integral with or otherwise fixedly secured to the lower portion of the said section, the said feet 17 being provided with track portions 18 which are adapted to receive and slidably engage the bifurcated ends of downwardly projecting brackets 19 which may be formed integral with or otherwise fixedly secured to the lower portion of the lower adjustable section 11 to thus form a substantially rigid support for the aforesaid relatively movable unit.

As hereinbefore stated the lower and upper sections 10 and 12 respectively comprises the substantially stationary vertical unit while the lower and upper sections 11 and 13 respectively comprises the substantially movable vertical unit, the said movable unit being adapted for adjustment in an axial direction with respect to the aforesaid stationary unit. The said units being fixedly secured or clamped together in any desired and adjusted operative position by bolts 20 passing through integral lugs 21 formed on the sections 10, 11, 12 and 13.

The sections 10, 11, 12 and 13 as hereinbefore stated are formed hollow substantially as shown in dotted lines in Fig. 1 and in full lines in Fig. 3 to provide steam compartments 22, 23, 24 and 25 for the heating of my mold.

The steam is supplied to my mold through flexible pipes or hose 26 the ends of which are fixedly secured or clamped by bands 27 to the outer ends of nipples 28, the said nipples being threadably engaged on their inner ends in bosses 29 formed on the upper portion of the sections 12 and 13 and are adapted to communicate with the upper compartments 22 and 23 to furnish a supply of steam for the same.

To establish communication between the upper compartments 22 and 23 and the lower compartments 24 and 25 and to insure a supply of relatively dry steam for the same, I have provided suitable pipe, valve and coupling connections comprising pipes 30, angle valves 31, nipples 32, ground joint couplings 33, pipes 34, globe valves, 35, elbows 36, T's 37, upper branch pipes 38, lower branch pipes 39 and couplings 40, all of which are connected substantially as shown in Figs. 1, 2 and 3 of the drawings. The inner ends of the pipes 30 being threadably engaged in the lower portions of the upper sections 12 and 13, while, the inner and upper ends of the upper branch pipes 38 are connected by the couplings 40 to the upper portions of the lower sections 10 and 11, the inner and lower ends of the lower branch pipes 39 being also connected by the couplings 40 to the lower sections 10 and 11 adjacent the lower portions thereof. The function of the ground joint couplings 33 being to provide means to facilitate the disconnecting of the piping subsequent to the completion of a retreading or vulcanizing operation to permit of the opening of my mold for the removal of the retreaded tire upon completion of the aforesaid operation. The angle valves 31 and the globe valves 35 being closed prior to the disconnecting of the couplings 33 to prevent the escape of steam from the various compartments and the ingress of air therein as will be readily understood.

It will be obvious from the foregoing and by referring to the drawings that the present form of pipe connections positively insure of a supply of fresh dry steam for the lower compartments 24 and 25 of my mold to thus maintain a uniform and constant temperature throughout the entire circumference of the said mold. The steam passing from the upper compartments 22 and 23 downwardly through the various connections to the T's 37 then passing upwardly through the upper branch pipes 38 to the upper portions of the compartments 24 and 25. Should any condensation take place in the upper compartments 22 and 23 or in the passage of the steam downwardly through the pipe connections, the water formed by the said condensation will separate from the steam at the T's 37 and pass downwardly through the lower branch pipes 39 to the lower portions of the compartments 24 and 25.

To provide drainage for the lower compartments 24 and 25 for the egress of the steam and the aforesaid condensation I have formed in the walls of the said compartments adjacent their lowermost portion thereof outlet openings or apertures 41 which are adapted to communicate with suitable drain pipes 42.

To adapt my mold for retreading tires of varying widths and of slightly varying diameters I provide a plurality of matrices, 45, 46 and 47, of varying widths for use with the same formed substantially as shown in transverse section in Fig. 4. In practice I have found it advisable to construct said matrices in circumferential segments to expedite the positioning in and the removal of the same from the sections comprising my mold.

The matrices 45, 46 and 47 are provided with medially disposed circumferential flanges 48 the thickness of which are graduated and determine the widths of tires for which each will be used. The said flanges 48 are adapted to be interposed between the sections comprising the substantially stationary unit and the sections comprising the relatively movable or adjustable unit of my mold when the matrices are operatively disposed therein as shown in Figs. 3, 5, and 6 being fixedly secured therein by the bolts 20.

In Fig. 4 it will be seen that the matrices 45, 46 and 47 are provided on their circumferences with similarly shaped upper and lower angularly disposed surfaces 50 which are adapted to conform with and abut similarly shaped surfaces 51 formed on the inner walls of the sections 10, 11, 12 and 13 of my mold when the said matrices are operatively disposed therein.

The inner face of the matrices 45, 46 and 47 are provided with medially disposed arcuate surfaces 52 the sides of which terminate in outwardly flaring arcuate surfaces 53 which merge at their lower and outer sides with the lower angularly disposed surfaces 50 to form wedge shaped portions 54 the edges of which are adapted to seat in annular grooves 55 formed in the inner walls of the sections 10, 11, 12 and 13 of my mold to thus prevent dislodgment of the said matrices when the latter are operatively disposed in the mold. The medially disposed arcuate surfaces 52 may be formed smooth, or if desired may have any suitable design formed thereon adapted for impression on the tire tread.

To provide the maximum cooling area for the tire casing during the vulcanizing process and to prevent impairment or deterioration of the inflated inner tube contained therein, I prefer to form the outer edge portions of the inner walls of the sections 10, 11, 12 and 13 with outwardly flaring arcuate surfaces 56. The numeral 57 indicates the annular air cooling areas for the said casing formed by the outer edges of the metal rim 58 of the tire and the aforesaid arcuate surfaces 56, see Fig. 6.

It will be apparent that when the segmented sections of the selected widths of matrices are operatively disposed within the mold the ends of the said sections are adapted to abut as shown to provide a continuous and unbroken surface which is adapted to bear on and uniformly engage the circumference of an inflated tire when the latter is operatively disposed therein to permit of the entire circumference being vulcanized simultaneously in a single operation.

In the operation of my mold the same is opened by removing the bolts 16, disconnecting the ground joint couplings 33 and closing the valves 31 and 35, then swinging the upper sections 12 and 13 upwardly and backwardly, then positioning the selected widths of matrix segments between the lower sections 10 and 11 and the upper sections 12 and 13, then clamping the said segments in position by tightening the bolts 20. In practice I have found it advisable in order to obtain the best results to retain the tire to be retreaded on its associated rim or wheel as shown in Fig. 6 during the vulcanizing process. I prepare the casing of the tire to be retreaded by stripping the same of the old material and building up the new surface all in a well known manner; when this has been done I deflate the inner tube and place the tire in the lower half of the mold, the upper half of the mold is then closed and clamped by the bolts 16. The inner tube is then inflated to preserve the normal shape of the tire casing during the vulcanizing process, and to maintain a uniform and constant peripheral pressure of the tread of the said casing. The couplings 33 are next connected and the valves 31 and 35 opened. Steam is then admitted to the mold through the hose connections 26, thence circulating through the compartments 22, 23, 24 and 25 to thus maintain a uniform and constant temperature during the determinate period necessary to complete the vulcanizing of the retread.

At the termination of the aforesaid determinate period the steam is shut off, the valves 31 and 35 are closed, the couplings 33 are disconnected, the bolts 16 are removed; the bolts 20 are loosened and the upper half of the mold comprising the sections 12 and 13 are swung upwardly and backwardly to permit the removal of the completed tire, the relatively movable unit of the mold sliding in an axial direction on its tracks 19 to expedite the aforesaid removal. In practice the matrix segments stick to the tire retread and are separated therefrom subsequent to the removal of the tire from the mold. The segments may be again replaced in the mold or other segments of different widths may be disposed therein and the aforementioned operation repeated.

It will be obvious that the outer contour of the matrices 45, 46 and 47 being identical with the exception of the circumferential flanges 48 that the said matrices will readily fit my mold by adjusting the relatively movable unit of the same on its tracks 19.

From the foregoing description taken in connection with the accompanying drawings the form of construction and method of operation of my tire mold will be readily apparent to those skilled in the art to which the invention pertains, but, while I have described the principle of operation of the invention together with the device which I now consider to be the best embodiment thereof, it will be understood that the apparatus shown is merely illustrative and that such changes may be made as are within the scope and spirit of the invention.

What I claim is:—

1. A tire mold comprising a pair of complementary annular units disposed in coaxial relation, each of which units comprise complementary semi-circular sections, hinge connections for the said sections, clamping means for the said sections, axial adjusting means for the said units and clamping means for the same.

2. A tire mold comprising a pair of complementary annular units disposed in coaxial relation, each of which units comprise complementary semi-circular hollow sections in superposed relation, hinge connections for the said sections, clamping means for the said sections, axial adjusting means for the said units, clamping means for the said units and heating means for the said mold.

3. A tire mold comprising a pair of complementary annular units disposed in coaxial relation, each of which units comprise complementary semi-circular sections, hinge connections for the said sections, clamping means for the said sections, segmental matrices adapted to be disposed within the said sections and to be interposed between the said units, axial adjusting means for the said units and clamping means for the same.

4. A tire mold comprising a pair of complementary annular units disposed in coaxial relation, each of which units comprise complementary semi-circular hollow sections in superposed relation, hinge connections for the said sections, clamping means for the said sections, a plurality of arcuate segmental matrices adapted to be disposed within the said sections and to be interposed between the said units, axial adjusting means for the said units, clamping means for the said units and heating means for the said mold.

5. A tire mold adapted to receive matrices of varying width comprising a pair of complementary annular units disposed in coaxial relation, sectional matrices having circumferential flanges of varying thicknesses adapted to be interposed between the said units, axial adjusting means for the said units and clamping means for the same.

6. A tire mold adapted to receive matrices of varying widths comprising a pair of complementary annular units disposed in coaxial relation, each of which units comprise complementary semi-circular sections, hinge connections for the said sections, clamping means for the said sections, a plurality of segmental matrices which are removable and replacable relative to the said sections, circumferential flanges of varying thicknesses disposed on the said matrices, adapted to be interposed and fixedly retained between the aforesaid units, axial adjusting means for the said units and clamping means for the same.

7. A tire mold adapted to receive matrices of varying widths comprising a pair of complementary annular units disposed in coaxial relation, each of which units comprise complementary semi-circular hollow sections in superposed relation, hinged connections for the said hollow sections, clamping means for the said sections, a plurality of segmental matrices which are removable and replacable relative to the said sections, circumferential flanges of varying thickness medially disposed on the peripheral portions of the said matrices adapted to be interposed and fixedly retained between the aforesaid units, axial adjusting means for the said units, clamping means for the said units and heating means for the said mold.

In witness whereof, I hereunto subscribe my name this 21st day of July A. D. 1920.

CLARENCE P. MUNDALE.